No. 888,128. PATENTED MAY 19, 1908.
G. A. THOMPSON.
CHURN.
APPLICATION FILED JULY 1, 1907.
2 SHEETS—SHEET 1.
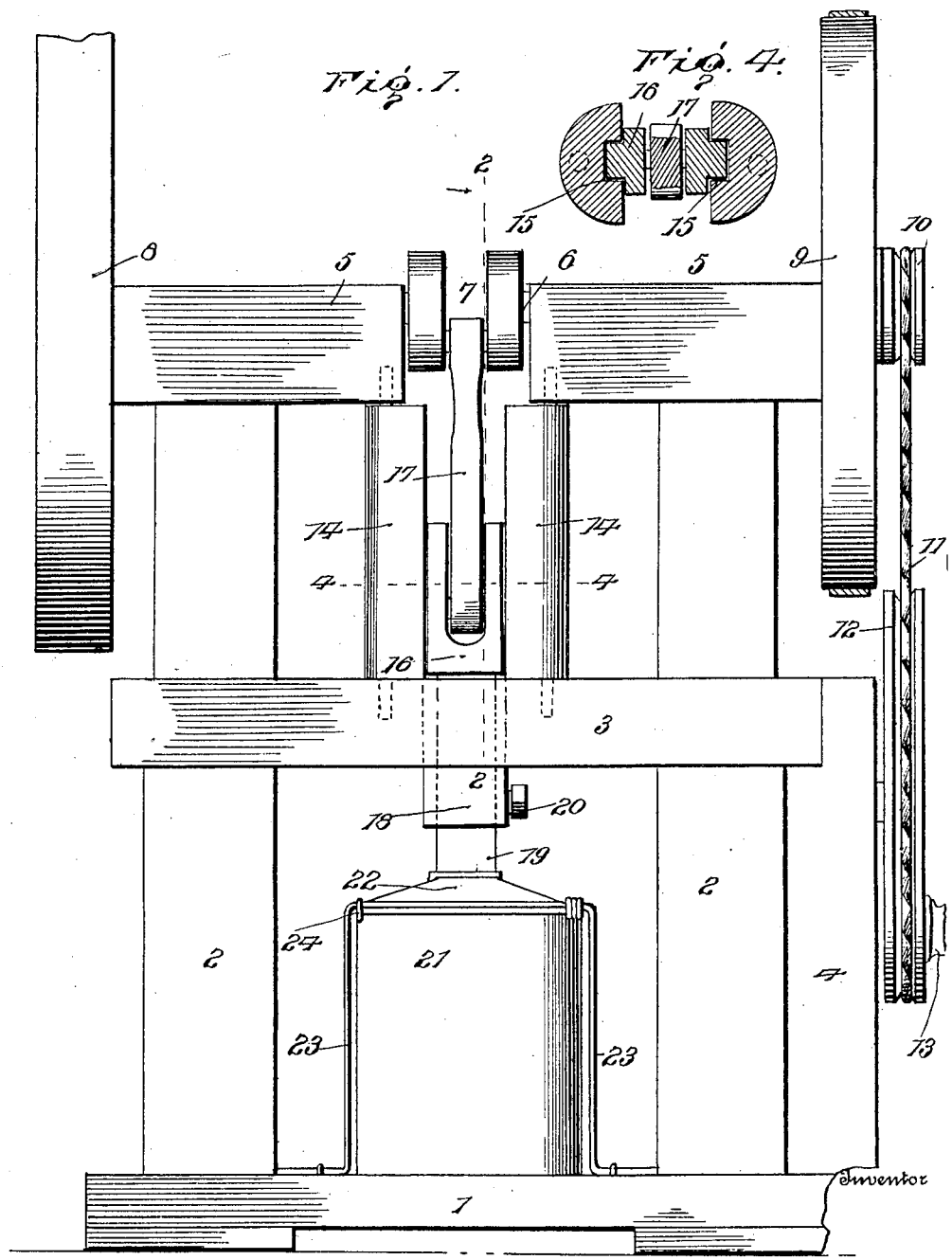

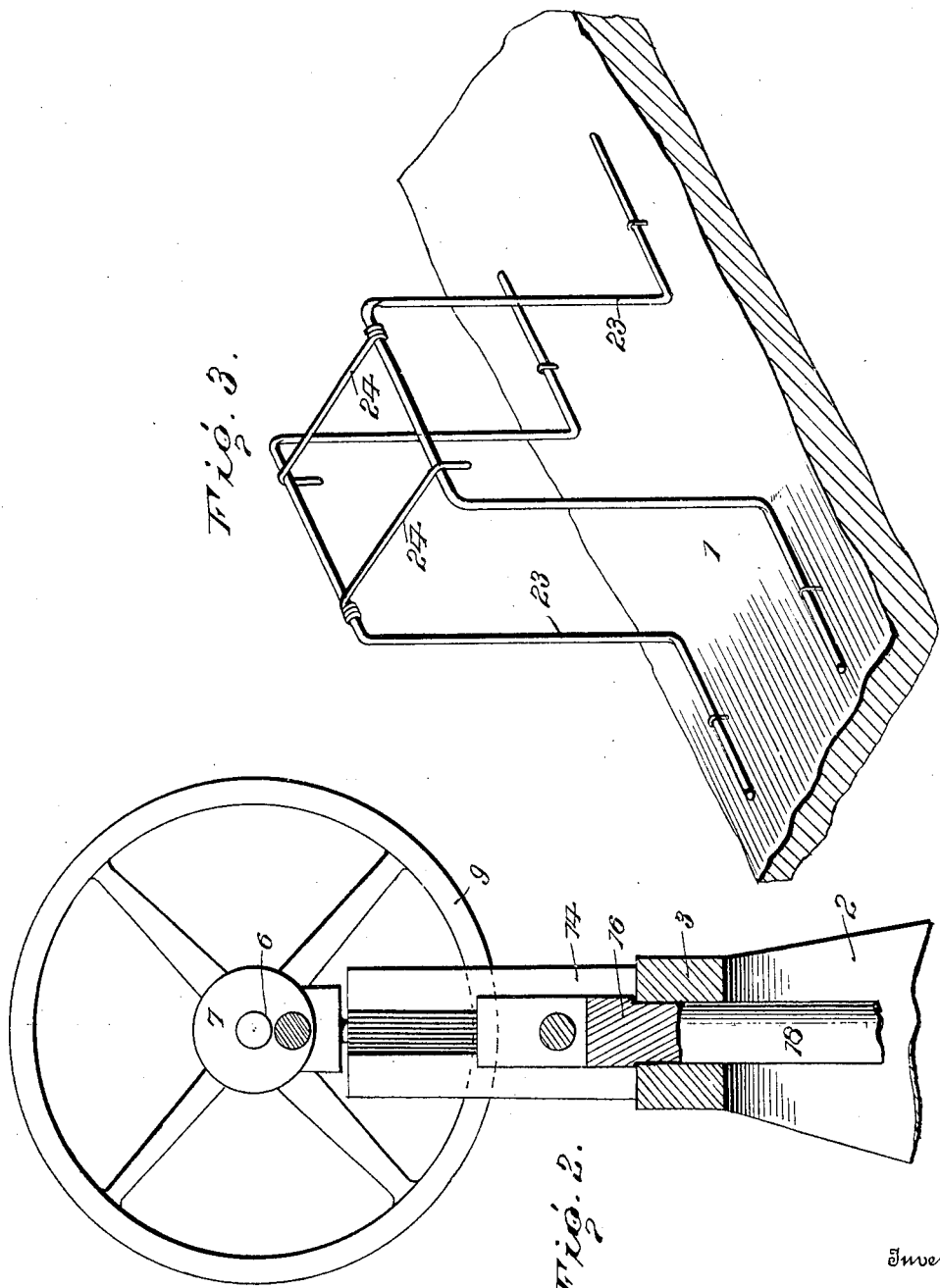

UNITED STATES PATENT OFFICE.

GEORGE A. THOMPSON, OF OLIO, ARKANSAS, ASSIGNOR OF ONE-HALF TO WILLIAM P. JAMES, OF OLIO, ARKANSAS.

CHURN.

No. 888,128.  Specification of Letters Patent.  Patented May 19, 1908.

Application filed July 1, 1907. Serial No. 381,690.

*To all whom it may concern:*

Be it known that I, GEORGE A. THOMPSON, citizen of the United States, residing at Olio, in the county of Scott and State of Arkansas, have invented certain new and useful Improvements in Churns, of which the following is a specification.

The present invention relates to certain new and useful improvements in churns of that type which embody a vertical reciprocating dasher, and aims to provide a novel construction whereby the oily globules may be quickly and thoroughly separated from the milk or cream.

The invention resides principally in the provision of a novel mechanism for operating the dasher rod, and in the means employed for clamping the churn body in coöperative relation to the dasher operating mechanism.

For a full understanding of the invention and the merits thereof and also to acquire a knowledge of the details of construction and of the means for effecting the result, reference is to be had to the following description and accompanying drawings, in which:

Figure 1 is a front elevation of a churn embodying the invention; Fig. 2 is a vertical sectional view on the line 2—2 of Fig. 1; Fig. 3 is an enlarged detail view of the clamp for locking the churn body in position; and, Fig. 4 is a horizontal sectional view on the line 4—4 of Fig. 1.

Corresponding and like parts are referred to in the following description and indicated in all the views of the drawings by the same reference characters.

The numeral 1 designates the base of the churn, and extending upwardly from opposite sides of the base are the standards 2. A cross bar 3 connects the intermediate portions of the standards 2, the said cross bar being formed at its end portions with openings receiving the standards, and blocks 4 being applied to opposite sides of the standards between the base and the cross bar. Bearing blocks 5 are mounted upon the upper ends of the standards 2 and receive a shaft 6 formed with an intermediate crank portion 7. Fly wheels 8 and 9 are keyed upon or otherwise made rigid with opposite ends of the shaft 6, the fly wheel 9 being shown as somewhat smaller than the fly wheel 8. The shaft 6 is also provided with a pulley 10 which, in the present instance is located adjacent the smaller fly wheel 9 and receives a belt 11 engaging a drive wheel 12 mounted upon one of the standards 2. This fly wheel 12 is provided with any suitable handle 13 by means of which the wheel may be turned and motion imparted to the shaft 6.

Swinging guide blocks 14 are mounted between the inner ends of the bearing blocks 5 and the intermediate cross bar 3 and are formed upon their adjacent faces with the longitudinal grooves 15 receiving corresponding tongues upon the vertical reciprocating cross head 16, the said guide blocks swing about a longitudinal axis. The upper end of the cross head is bifurcated and receives the lower extremity of a pitman 17, the upper end of which is pivotally connected to the crank portion 7 of the shaft 6 whereby when the said shaft is rotated, the cross head is given an up and down movement. A rod 18 projects downwardly from the cross head 16 and passes loosely through the cross bar 3, the lower end of the rod 18 having a socket formed therein designed to receive the upper end of the dasher rod 19, a set screw 20 being employed to produce a rigid connection between the two members. The churn body 21 is designed to rest upon the base 1 between the standards 2 and is provided with a cover 22 through which the dasher rod 19 slides freely. In order to lock the churn body 21 in position, a pair of bails 23 are employed, the said bails comprising inverted U-shaped members, the arms of which have their lower extremities extended outwardly and pivotally connected to the base. After the churn body 21 has been placed in position, the bails 23 are swung upwardly so as to engage the same and are held in this position by means of the locking members 24. In the present instance, these locking members 24 are in the nature of hooks, the cross bar of each of the bails 23 having one of the hooks pivotally connected thereto. After the churn has thus been locked in position, the dasher is given a quick reciprocating movement by turning the drive wheel 12 and the milk or cream is thoroughly agitated in such a manner as to hasten the formation of butter.

Having thus described the invention, what is claimed as new is:

1. In a churn, the combination of a base, a churn body resting removably upon the base, a pair of inverted U-shaped swinging bails pivotally connected to the base and adapted to be swung over the churn body from opposite sides thereof, hook members carried by the bails and serving to detachably connect the same for the purpose of holding the churn body upon the base, and a dasher operating mechanism mounted upon the base in coöperative relation to the churn body.

2. In a churn, the combination of a base, a standard upon the base, a pair of oppositely disposed guide blocks carried by the standard and pivotally mounted so as to swing about a longitudinal axis, a reciprocating cross head slidingly mounted between the oppositely disposed swinging guide blocks, means for actuating the cross head, a churn body upon the base, a dasher within the churn body, and connecting means between the dasher and cross head.

3. In a churn, the combination of a base, a pair of standards carried by the base, a cross bar connecting the standards, a bearing block mounted upon each of the standards, a shaft journaled in the bearing blocks and provided with a crank portion, means for driving the shaft, a pair of oppositely disposed guide-blocks mounted between the cross bar and bearing blocks so as to swing about a longitudinal axis, a reciprocating cross head mounted between the guide-blocks, connecting means between the cross head and the crank portion of the before-mentioned shaft, a churn body upon the base, a dasher within the churn body and connecting means between the dasher and cross head.

In testimony whereof I affix my signature in presence of two witnesses.

GEORGE A. THOMPSON. [L. S.]

Witnesses:
    J. F. ANDERSON,
    JOHN D. BENSON.